US008077769B2

United States Patent
Krishnan (10) Patent No.: US 8,077,769 B2
(45) Date of Patent: Dec. 13, 2011

(54) METHOD OF REDUCING COMPUTATIONS IN TRANSFORM AND SCALING PROCESSES IN A DIGITAL VIDEO ENCODER USING A THRESHOLD-BASED APPROACH

(75) Inventor: Rathish Krishnan, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1295 days.

(21) Appl. No.: 11/392,320

(22) Filed: Mar. 28, 2006

(65) Prior Publication Data
US 2007/0237235 A1  Oct. 11, 2007

(51) Int. Cl.
*H04B 1/66* (2006.01)
*H04N 7/12* (2006.01)
*H04N 11/02* (2006.01)
*H04N 11/04* (2006.01)

(52) U.S. Cl. ............. 375/240; 375/240.03; 375/240.18; 375/240.19; 375/240.02; 704/500; 704/501; 704/502; 382/248; 382/250; 382/251; 382/253

(58) Field of Classification Search ............. 375/240.03, 375/240.01, 240.18, 240.19, 240.2
See application file for complete search history.

(56) References Cited

U.S. PATENT DOCUMENTS

| | | | | |
|---|---|---|---|---|
| 5,594,812 | A | 1/1997 | Boliek et al. | 382/232 |
| 5,699,118 | A | 12/1997 | Bolton | 348/405 |
| 5,757,668 | A * | 5/1998 | Zhu | 375/240.16 |
| 5,885,841 | A * | 3/1999 | Higgs et al. | 436/89 |
| 6,272,253 | B1 | 8/2001 | Bannon et al. | 382/236 |
| 6,614,847 | B1 | 9/2003 | Das et al. | 375/240.16 |
| 6,859,559 | B2 | 2/2005 | Boon et al. | 382/238 |
| 6,882,685 | B2 | 4/2005 | Malvar | 375/240.03 |
| 6,990,506 | B2 | 1/2006 | Sun | 708/402 |
| 2003/0035587 | A1 * | 2/2003 | Youn | 382/238 |
| 2004/0264575 | A1 | 12/2004 | Bjontegaard | 375/240.18 |
| 2005/0013367 | A1 | 1/2005 | Gallant et al. | 375/240.16 |
| 2005/0031040 | A1 * | 2/2005 | Chujoh et al. | 375/240.24 |
| 2005/0058356 | A1 | 3/2005 | Shen et al. | 382/238 |
| 2005/0069211 | A1 | 3/2005 | Lee et al. | 382/239 |
| 2005/0094893 | A1 * | 5/2005 | Samadani | 382/275 |
| 2005/0207495 | A1 | 9/2005 | Ramasastry et al. | 375/240.16 |
| 2005/0244063 | A1 * | 11/2005 | Kwon et al. | 382/233 |

(Continued)

OTHER PUBLICATIONS

Ralf Schafer et al., The Emerging H.264/AVC Standard, Jan. 2003, p. 1-12, EBU Techincal Review.

(Continued)

*Primary Examiner* — Eva Puente
*Assistant Examiner* — Gina McKie
(74) *Attorney, Agent, or Firm* — Haverstock & Owens LLP (57) ABSTRACT

A method of reducing computations utilizing a threshold to increase efficiency and speed of a video encoder is described. Computations of transform and scaling processes of a video encoder are able to be streamlined by utilizing one or more thresholds stored within one or more lookup tables. A selected threshold is compared with a value before scaling. If the value before scaling is less than the threshold, it is known that the coefficient will be zero and thus no further computations are required. Furthermore, the coefficient is set to zero. If the value before scaling is greater than the threshold, then further calculations are performed. The method is able to be extended to eliminate computations in forward transform as well. By skipping computations when the coefficient is zero, the method eliminates wasted computation power and time.

36 Claims, 5 Drawing Sheets

U.S. PATENT DOCUMENTS

| | | | |
|---|---|---|---|
| 2005/0249277 A1 | 11/2005 | Ratakonda et al. | |
| 2005/0265454 A1 | 12/2005 | Muthukrishnan et al. | 375/240.16 |
| 2005/0276330 A1 | 12/2005 | Park et al. | 375/240.17 |
| 2005/0281337 A1 | 12/2005 | Kobayashi et al. | 375/240.18 |
| 2006/0018552 A1* | 1/2006 | Malayath et al. | 382/232 |
| 2006/0034539 A1* | 2/2006 | Nachlieli et al. | 382/260 |
| 2006/0056719 A1* | 3/2006 | Yu et al. | 382/239 |
| 2006/0078048 A1* | 4/2006 | Bjontegaard | 375/240.03 |
| 2006/0133478 A1* | 6/2006 | Wen | 375/240.03 |
| 2006/0262854 A1* | 11/2006 | Lelescu et al. | 375/240.16 |
| 2006/0285594 A1* | 12/2006 | Kim et al. | 375/240.16 |
| 2007/0009027 A1* | 1/2007 | Zhu et al. | 375/240.03 |
| 2007/0104272 A1* | 5/2007 | He et al. | 375/240.12 |
| 2007/0206872 A1 | 9/2007 | Song | |

OTHER PUBLICATIONS

Iain E G Richardson, H.264 / MPEG-4 Part 10 White Paper, Mar. 19, 2003, pp. 1-9, www.vcodex.com, Transform & Quantization.

Gary J. Sullivan et al., The H.264 / AVC Advanced Video Coding Standard: Overview and Introduction to the Fidelity Range Extensions, Aug. 2004, pp. 1-24.

Yeping Su et al., Efficient MPEG-2 to H.264/AVC Intra Transcoding in Transform-Domain, Dec. 2005, pp. 5, Mitsubishi Electric Research Laboratories http://www.merl.com.

Jun Xin Efficient Macroblock Coding-Mode Decision for H.264/AVC Video Coding, pp. 6, Mitsubishi Electric Research Laboratories, Cambridge, MA, {jxin,avetro,hsun}@merl.com.

Keng-Pang Lim et al., Text Description of Joint Model Reference Encoding Methods and Decoding Concealment Methods, Jan. 2005, pp. 1-43, Study of ITU-T Rec. H.264 and ITU-T Rec. H.2.64.2.

Libo Yang et al., Prediction-Based Directional Fractional Pixel Motion Estimation for H.264 Video Coding, 2005, pp. II-901-II-904, Department of Information and Electronic Engineering, Zhejiang University, Hangzhou, China, Microsoft Research Asia, 3F Sigma Building, 49 Zhichun Road, Beijing 100080, China.

Antti Hallapuro et al., Low Complexity Transform and Quantization—Part I: Basic Implementation, Jan. 14, 2002, pp. 1-18, Nokia Corporation and Microsoft Corporation.

Keng-Pang Lim et al., Text Description of Joint Model Reference Encoding Methods and Decoding Concealment Methods, Jan. 2005, Study of ITU-T Rec. H.264 and ITU-T Rec. H.2.64.2.

Gary Sullivan et al., Draft of Version 4 of H.264/AVC (ITU-T Recommendation H.264 and ISO/IEC 14496-10 (MPEG-4 part 10) Advanced Video Coding), Nov. 11, 2004, pp. I-315, Draft Third Edition of ITU-T Rec. H.264 (E).

Yu-Wen Huang et al., Analysis, Fast Algorithm, and VLSI Architecture Design for H.264/AVC Intra Frame Coder, IEEE Transactions on Circuits and Systems for Video Technology 2005.

H.264 / MPEG-4 Part 10 White Paper Revised Apr. 2003, pp. 1-6, www.vcodex.com H.264 / MPEG-4 Part 10: Intra Prediction.

* cited by examiner

Fig. 1

| QSy | P-macroblock Thresholds for Coefficients | | | | | | | |
|---|---|---|---|---|---|---|---|---|
| | (0,0) & (2,0) | (0,1) & (2,1) | (0,2) & (2,2) | (0,3) & (2,3) | (1,0) & (3,0) | (1,1) & (3,1) | (1,2) & (3,2) | (1,3) & (3,3) |
| 0 | 2 | 3 | 2 | 3 | 3 | 5 | 3 | 5 |
| 1 | 2 | 3 | 2 | 3 | 3 | 5 | 3 | 5 |
| 2 | 2 | 4 | 2 | 4 | 4 | 6 | 4 | 6 |
| 3 | 2 | 4 | 2 | 4 | 4 | 7 | 4 | 7 |
| 4 | 3 | 5 | 3 | 5 | 5 | 8 | 5 | 8 |
| 5 | 3 | 5 | 3 | 5 | 5 | 9 | 5 | 9 |
| 6 | 4 | 6 | 4 | 6 | 6 | 10 | 6 | 10 |
| 7 | 4 | 7 | 4 | 7 | 7 | 11 | 7 | 11 |
| 8 | 5 | 8 | 5 | 8 | 8 | 13 | 8 | 13 |
| 9 | 5 | 9 | 5 | 9 | 9 | 14 | 9 | 14 |
| 10 | 6 | 10 | 6 | 10 | 10 | 16 | 10 | 16 |
| 11 | 7 | 11 | 7 | 11 | 11 | 18 | 11 | 18 |
| 12 | 8 | 13 | 8 | 13 | 13 | 20 | 13 | 20 |
| 13 | 9 | 14 | 9 | 14 | 14 | 23 | 14 | 23 |
| 14 | 10 | 16 | 10 | 16 | 16 | 26 | 16 | 26 |
| 15 | 11 | 18 | 11 | 18 | 18 | 29 | 18 | 29 |
| 16 | 13 | 20 | 13 | 20 | 20 | 32 | 20 | 32 |
| 17 | 14 | 23 | 14 | 23 | 23 | 37 | 23 | 37 |
| 18 | 16 | 27 | 16 | 27 | 27 | 41 | 27 | 41 |
| 19 | 18 | 29 | 18 | 29 | 29 | 46 | 29 | 46 |
| 20 | 21 | 33 | 21 | 33 | 33 | 52 | 33 | 52 |
| 21 | 23 | 37 | 23 | 37 | 37 | 59 | 37 | 59 |
| 22 | 26 | 41 | 26 | 41 | 41 | 65 | 41 | 65 |
| 23 | 29 | 47 | 29 | 47 | 47 | 75 | 47 | 75 |
| 24 | 33 | 54 | 33 | 54 | 54 | 83 | 54 | 83 |
| 25 | 36 | 58 | 36 | 58 | 58 | 93 | 58 | 93 |
| 26 | 43 | 66 | 43 | 66 | 66 | 104 | 66 | 104 |
| 27 | 46 | 75 | 46 | 75 | 75 | 119 | 75 | 119 |
| 28 | 53 | 83 | 53 | 83 | 83 | 130 | 83 | 130 |
| 29 | 59 | 95 | 59 | 95 | 95 | 151 | 95 | 151 |
| 30 | 66 | 108 | 66 | 108 | 108 | 166 | 108 | 166 |
| 31 | 73 | 116 | 73 | 116 | 116 | 187 | 116 | 187 |
| 32 | 86 | 133 | 86 | 133 | 133 | 208 | 133 | 208 |
| 33 | 93 | 150 | 93 | 150 | 150 | 239 | 150 | 239 |
| 34 | 106 | 166 | 106 | 166 | 166 | 260 | 166 | 260 |
| 35 | 119 | 191 | 119 | 191 | 191 | 302 | 191 | 302 |
| 36 | 133 | 216 | 133 | 216 | 216 | 333 | 216 | 333 |
| 37 | 146 | 233 | 146 | 233 | 233 | 375 | 233 | 375 |
| 38 | 173 | 266 | 173 | 266 | 266 | 416 | 266 | 416 |
| 39 | 186 | 300 | 186 | 300 | 300 | 479 | 300 | 479 |
| 40 | 213 | 333 | 213 | 333 | 333 | 520 | 333 | 520 |
| 41 | 239 | 383 | 239 | 383 | 383 | 604 | 383 | 604 |
| 42 | 266 | 433 | 266 | 433 | 433 | 666 | 433 | 666 |
| 43 | 293 | 466 | 293 | 466 | 466 | 750 | 466 | 750 |
| 44 | 346 | 533 | 346 | 533 | 533 | 833 | 533 | 833 |
| 45 | 373 | 600 | 373 | 600 | 600 | 958 | 600 | 958 |
| 46 | 426 | 666 | 426 | 666 | 666 | 1041 | 666 | 1041 |
| 47 | 479 | 766 | 479 | 766 | 766 | 1208 | 766 | 1208 |
| 48 | 533 | 866 | 533 | 866 | 866 | 1333 | 866 | 1333 |
| 49 | 586 | 933 | 586 | 933 | 933 | 1500 | 933 | 1500 |
| 50 | 693 | 1066 | 693 | 1066 | 1066 | 1666 | 1066 | 1666 |
| 51 | 746 | 1200 | 746 | 1200 | 1200 | 1916 | 1200 | 1916 |

Fig. 2

| QSy | I-macroblock Thresholds for Coefficients ||||||||
|---|---|---|---|---|---|---|---|---|
| | (0,0) & (2,0) | (0,1) & (2,1) | (0,2) & (2,2) | (0,3) & (2,3) | (1,0) & (3,0) | (1,1) & (3,1) | (1,2) & (3,2) | (1,3) & (3,3) |
| 0 | 1 | 2 | 1 | 2 | 2 | 4 | 2 | 4 |
| 1 | 1 | 2 | 1 | 2 | 2 | 4 | 2 | 4 |
| 2 | 2 | 3 | 2 | 3 | 3 | 5 | 3 | 5 |
| 3 | 2 | 3 | 2 | 3 | 3 | 5 | 3 | 5 |
| 4 | 2 | 4 | 2 | 4 | 4 | 6 | 4 | 6 |
| 5 | 3 | 4 | 3 | 4 | 4 | 7 | 4 | 7 |
| 6 | 3 | 5 | 3 | 5 | 5 | 8 | 5 | 8 |
| 7 | 3 | 5 | 3 | 5 | 5 | 9 | 5 | 9 |
| 8 | 4 | 6 | 4 | 6 | 6 | 10 | 6 | 10 |
| 9 | 4 | 7 | 4 | 7 | 7 | 11 | 7 | 11 |
| 10 | 5 | 8 | 5 | 8 | 8 | 13 | 8 | 13 |
| 11 | 5 | 9 | 5 | 9 | 9 | 15 | 9 | 15 |
| 12 | 6 | 10 | 6 | 10 | 10 | 16 | 10 | 16 |
| 13 | 7 | 11 | 7 | 11 | 11 | 18 | 11 | 18 |
| 14 | 8 | 13 | 8 | 13 | 13 | 20 | 13 | 20 |
| 15 | 9 | 15 | 9 | 15 | 15 | 23 | 15 | 23 |
| 16 | 10 | 16 | 10 | 16 | 16 | 26 | 16 | 26 |
| 17 | 11 | 19 | 11 | 19 | 19 | 30 | 19 | 30 |
| 18 | 13 | 21 | 13 | 21 | 21 | 33 | 21 | 33 |
| 19 | 14 | 23 | 14 | 23 | 23 | 37 | 23 | 37 |
| 20 | 17 | 26 | 17 | 26 | 26 | 41 | 26 | 41 |
| 21 | 18 | 30 | 18 | 30 | 30 | 47 | 30 | 47 |
| 22 | 21 | 33 | 21 | 33 | 33 | 52 | 33 | 52 |
| 23 | 23 | 38 | 23 | 38 | 38 | 60 | 38 | 60 |
| 24 | 26 | 43 | 26 | 43 | 43 | 66 | 43 | 66 |
| 25 | 29 | 46 | 29 | 46 | 46 | 75 | 46 | 75 |
| 26 | 34 | 53 | 34 | 53 | 53 | 83 | 53 | 83 |
| 27 | 37 | 60 | 37 | 60 | 60 | 95 | 60 | 95 |
| 28 | 42 | 66 | 42 | 66 | 66 | 104 | 66 | 104 |
| 29 | 47 | 76 | 47 | 76 | 76 | 120 | 76 | 120 |
| 30 | 53 | 86 | 53 | 86 | 86 | 133 | 86 | 133 |
| 31 | 58 | 93 | 58 | 93 | 93 | 150 | 93 | 150 |
| 32 | 69 | 106 | 69 | 106 | 106 | 166 | 106 | 166 |
| 33 | 74 | 120 | 74 | 120 | 120 | 191 | 120 | 191 |
| 34 | 85 | 133 | 85 | 133 | 133 | 208 | 133 | 208 |
| 35 | 95 | 153 | 95 | 153 | 153 | 241 | 153 | 241 |
| 36 | 106 | 173 | 106 | 173 | 173 | 266 | 173 | 266 |
| 37 | 117 | 186 | 117 | 186 | 186 | 300 | 186 | 300 |
| 38 | 138 | 213 | 138 | 213 | 213 | 333 | 213 | 333 |
| 39 | 149 | 240 | 149 | 240 | 240 | 383 | 240 | 383 |
| 40 | 170 | 266 | 170 | 266 | 266 | 416 | 266 | 416 |
| 41 | 191 | 306 | 191 | 306 | 306 | 483 | 306 | 483 |
| 42 | 213 | 346 | 213 | 346 | 346 | 533 | 346 | 533 |
| 43 | 234 | 373 | 234 | 373 | 373 | 600 | 373 | 600 |
| 44 | 277 | 426 | 277 | 426 | 426 | 666 | 426 | 666 |
| 45 | 298 | 480 | 298 | 480 | 480 | 766 | 480 | 766 |
| 46 | 341 | 533 | 341 | 533 | 533 | 833 | 533 | 833 |
| 47 | 383 | 613 | 383 | 613 | 613 | 966 | 613 | 966 |
| 48 | 426 | 693 | 426 | 693 | 693 | 1066 | 693 | 1066 |
| 49 | 469 | 746 | 469 | 746 | 746 | 1200 | 746 | 1200 |
| 50 | 554 | 853 | 554 | 853 | 853 | 1333 | 853 | 1333 |
| 51 | 597 | 960 | 597 | 960 | 960 | 1533 | 960 | 1533 |

METHOD OF REDUCING COMPUTATIONS IN TRANSFORM AND SCALING PROCESSES IN A DIGITAL VIDEO ENCODER USING A THRESHOLD-BASED APPROACH

FIELD OF THE INVENTION

The present invention relates to the field of video compression. More specifically, the present invention relates to reducing computations in transform and scaling processes in digital video encoders.

BACKGROUND OF THE INVENTION

A video sequence consists of a number of pictures, usually called frames. Subsequent frames are very similar, thus containing a lot of redundancy from one frame to the next. Before being efficiently transmitted over a channel or stored in memory, video data is compressed to conserve both bandwidth and memory. The goal is to remove the redundancy to gain better compression ratios. A first video compression approach is to subtract a reference frame from a given frame to generate a relative difference. A compressed frame contains less information than the reference frame. The relative difference can be encoded at a lower bit-rate with the same quality. The decoder reconstructs the original frame by adding the relative difference to the reference frame.

A more sophisticated approach is to approximate the motion of the whole scene and the objects of a video sequence. The motion is described by parameters that are encoded in the bit-stream. Pixels of the predicted frame are approximated by appropriately translated pixels of the reference frame. This approach provides an improved predictive ability than a simple subtraction. However, the bit-rate occupied by the parameters of the motion model must not become too large.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

The intent of the H.264/AVC project was to develop a standard capable of providing good video quality at bit rates that are substantially lower than what previous standards would need (e.g. MPEG-2, H.263, or MPEG-4 Part 2). Furthermore, it was desired to make these improvements without such a large increase in complexity that the design is impractical to implement. An additional goal was to make these changes in a flexible way that would allow the standard to be applied to a wide variety of applications such that it could be used for both low and high bit rates and low and high resolution video. Another objective was that it would work well on a very wide variety of networks and systems.

H.264/AVC/MPEG-4 Part10 contains many new features that allow it to compress video much more effectively than older standards and to provide more flexibility for application to a wide variety of network environments. Some key features include multi-picture motion compensation using previously-encoded pictures as references, variable block-size motion compensation (VBSMC) with block sizes as large as 16×16 and as small as 4×4, six-tap filtering for derivation of half-pel luma sample predictions, macroblock pair structure, quarter-pixel precision for motion compensation, weighted prediction, an in-loop deblocking filter, an exact-match integer 4×4 spatial block transform, a secondary Hadamard transform performed on "DC" coefficients of the primary spatial transform, spatial prediction from the edges of neighboring blocks for "intra" coding, context-adaptive binary arithmetic coding (CABAC), context-adaptive variable-length coding (CAVLC), a simple and highly-structured variable length coding (VLC) technique for many of the syntax elements not coded by CABAC or CAVLC, referred to as Exponential-Golomb coding, a network abstraction layer (NAL) definition, switching slices, flexible macroblock ordering, redundant slices (RS), supplemental enhancement information (SEI) and video usability information (VUI), auxiliary pictures, frame numbering and picture order count. These techniques, and several others, allow H.264 to perform significantly better than prior standards, and under more circumstances and in more environments. H.264 usually performs better than MPEG-2 video by obtaining the same quality at half of the bit rate or even less.

MPEG is used for the generic coding of moving pictures and associated audio and creates a compressed video bitstream made up of a series of three types of encoded data frames. The three types of data frames are an intra frame (called an I-frame or I-picture), a bi-directional predicted frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame order. Such frames are usually predicted from two directions, for example from the I- or P-frames that immediately precede or the P-frame that immediately follows the predicted frame. These bidirectionally predicted frames are called B-frames.

There are many possible GOP structures. A common GOP structure is 15 frames long, and has the sequence I_BB_P_BB_P_BB_P_BB_P_BB_. A similar 12-frame sequence is also common. I-frames encode for spatial redundancy, P and B-frames for temporal redundancy. Because adjacent frames in a video stream are often well-correlated, P-frames and B-frames are only a small percentage of the size of I-frames. However, there is a trade-off between the size to which a frame can be compressed versus the processing time and resources required to encode such a compressed frame. The ratio of I, P and B-frames in the GOP structure is determined by the nature of the video stream and the bandwidth constraints on the output stream, although encoding time may also be an issue. This is particularly true in live transmission and in real-time environments with limited computing resources, as a stream containing many B-frames can take much longer to encode than an I-frame-only file.

B-frames and P-frames require fewer bits to store picture data, generally containing difference bits for the difference between the current frame and a previous frame, subsequent frame, or both. B-frames and P-frames are thus used to reduce redundancy information contained across frames. In operation, a decoder receives an encoded B-frame or encoded P-frame and uses a previous or subsequent frame to reconstruct the original frame. This process is much easier and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frames or B-frame is associated with an area in the previous or next image that it is well-correlated, as selected by the encoder using a "motion vector." The motion vector that maps the macroblock to its correlated area is encoded, and then the difference between the two areas is passed through the encoding process.

Conventional video codecs use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding, which is the approach used in the MPEG standards.

The output bit-rate of an MPEG encoder can be constant or variable, with the maximum bit-rate determined by the playback media. To achieve a constant bit-rate, the degree of quantization is iteratively altered to achieve the output bit-rate requirement. Increasing quantization leads to visible artifacts when the stream is decoded. The discontinuities at the edges of macroblocks become more visible as the bit-rate is reduced.

When the bit rate is fixed, the effective bit allocation can obtain better visual quality in video encoding. Conventionally, each frame is divided into foreground and background. More bits are typically allocated to the foreground objects and fewer bit are allocated to the background area based on the reasoning that viewers focus more on the foreground than the background. Such reasoning is based on the assumption that the viewer may not see the difference in the background if they do not focus on it. However, this is not always the case. Moreover, due to the characteristics of the H.264 standard, less bits in the background often leads to blurring, and the intra refresh phenomenon is very obvious when the background quality is low. The refresh in the static area, usually the background, annoys the human eye significantly and thus influences the visual quality.

To improve the quality of the background, a simple method allocates more bits to the background. This strategy will reduce the bits allocated to the foreground area, which is not an acceptable trade-off. Also, to make the fine details observable, the quantization scale needs to be reduced considerably, which means the bit-rate budget will be exceeded.

Another disadvantage is that the assumption of repetition of image sequence content is not true for most of the sequence. In most cases, the motion is mostly going along in one direction within several seconds. There is a limited match in previous frames for uncovered objects in the current frame. Unfortunately, state of the art long term motion prediction methods focus on the earlier frames as the reference.

An objective of the H.264 standard is to enable quality video at bit-rates that are substantially lower than what the previous standards would need. An additional objective is to provide this functionality in a flexible manner that allows the standard to be applied to a very wide variety of applications and to work well on a wide variety of networks and systems. Unfortunately, conventional encoders employing the MPEG standards tend to blur the fine texture details even in a relative high bit-rate. Also, the I-frame refresh is very obvious when the low bit-rate is used. As such, whenever an I-frame is displayed, the quality is much greater than the previous, non I-frames, which produces a discontinuity whenever the I-frame is displayed. Such a discontinuity is noticeable to the user. Although the MPEG video coding standard specifies a general coding methodology and syntax for the creation of a legitimate MPEG bit-stream, there are many opportunities left open to improve the quality of MPEG bit-streams.

SUMMARY OF THE INVENTION

A method of utilizing a threshold to increase efficiency and speed of a video encoder is described. There are two common transformation approaches for compression including block transform and wavelet transform. The block-based approach partitions the input data into small nonoverlapped blocks; each of them is then mapped into a block of coefficients via a particular block transform usually constructed from local cosine/sine bases. The type-II discrete cosine transform (DCT) is the most common block transform for visual data. Computations of transform and scaling processes of a video encoder are able to be streamlined by utilizing one or more thresholds stored within one or more lookup tables. A selected threshold is compared with a value before scaling. If the value before scaling is less than the threshold, it is known that the coefficient will be zero and thus no further computations are required. Furthermore, the coefficient is set to zero. If the value before scaling is greater than the threshold, then further calculations are performed. By skipping computations when the coefficient is zero, the method eliminates wasted computation power and time.

In one aspect, a method of reducing computations in transform and scaling processes in video encoding processes, comprises computing one or more thresholds, comparing a selected threshold from the one or more thresholds with a value before scaling and eliminating computations wherein the value before scaling is less than the threshold. The computations are reduced in a video encoder. The video encoder utilizes H.264 standard protocol. The method further comprises storing the one or more thresholds in one or more lookup tables. The one or more lookup tables include a table for P-macroblocks and a table for I-macroblocks. The method further comprises assigning one or more flags a first value when further computations need to be performed and a second value when further computations do not need to be performed. The computations eliminated include scaling. The value before scaling is a transform coefficient. The transform coefficient is determined by partitioning the input data into small nonoverlapped blocks and mapping each of the small nonoverlapped blocks into a block of coefficients.

In another aspect, a method of reducing computations in transform and scaling processes in video encoding processes, comprises storing one or more thresholds in one or more lookup tables, comparing a selected threshold from the one or more thresholds with a value before scaling and eliminating computations wherein the value before scaling is less than the threshold. The computations are reduced in a video encoder. The video encoder utilizes H.264 standard protocol. The one or more lookup tables include a table for P-macroblocks and a table for I-macroblocks. The method further comprises computing the one or more thresholds stored in the one or more lookup tables. The method further comprises assigning one or more flags a first value when further computations need to be performed and a second value when further computations do not need to be performed. The computations eliminated include scaling. The value before scaling is a transform coefficient. The transform coefficient is determined by partitioning the input data into small nonoverlapped blocks and mapping each of the small nonoverlapped blocks into a block of coefficients.

In another aspect, a method of reducing computations in transform and scaling processes in video encoding processes, comprises determining a threshold, computing a vertical transform, computing an absolute sum using the vertical transform and eliminating computations wherein the absolute sum is less than the threshold. The computations are reduced in a video encoder. The video encoder utilizes H.264 standard protocol. Determining a threshold utilizes one or more lookup tables. The one or more lookup tables include a table for P-macroblocks and a table for I-macroblocks. The method further comprises assigning one or more flags a first value when further computations need to be performed and a second value when further computations do not need to be performed. The computations eliminated include horizontal transform and scaling.

In yet another aspect, an apparatus comprises a program module for determining a threshold, computing a vertical transform, computing an absolute sum using the vertical transform and eliminating computations wherein the absolute sum is less than the threshold and a processor for executing the program module. The apparatus further comprises one or more databases for storing one or more lookup tables. The one or more lookup tables contain one or more thresholds. The one or more lookup tables include a table for P-macroblocks and a table for I-macroblocks. The program module utilizes the one or more lookup tables containing the one or more thresholds to determine the threshold. The apparatus further comprises one or more flags. The one or more flags are assigned a first value when further computations need to be performed and a second value when further computations do not need to be performed.

In another aspect, a video encoder comprises a decoder, a component for transforming, scaling and quantizing coupled to the decoder and an entropy coder coupled to the component for transforming, scaling and quantizing, wherein the entropy coder produces one or more compressed video bits, wherein the component for transforming, scaling and quantizing avoids computations where a value before scaling is less than a threshold. The video encoder further comprises a motion estimation component. The decoder provides decoded video. The video encoder further comprises one or more lookup tables. The one or more lookup tables contain one or more thresholds. The one or more lookup tables include a table for P-macroblocks and a table for I-macroblocks. The video encoder utilizes H.264 standard protocol. The component for transforming, scaling and quantizing avoids scaling where the value before scaling is less than the threshold. The value before scaling is a transform coefficient. The transform coefficient is determined by partitioning the input data into small nonoverlapped blocks and mapping each of the small nonoverlapped blocks into a block of coefficients.

In yet another aspect, a video capture and display device comprises a receiving unit for receiving video data, a display unit coupled to the receiving unit for displaying video data and an encoder coupled to the receiving unit and the display unit for producing one or more compressed video bits, wherein the encoder avoids computations where a value before scaling is less than a threshold. The video capture and display device further comprises one or more lookup tables. The one or more lookup tables contain one or more thresholds. The one or more lookup tables include a table for P-macroblocks and a table for I-macroblocks. The encoder utilizes H.264 standard protocol. The encoder avoids scaling where the value before scaling is less than the threshold. The value before scaling is a transform coefficient. The transform coefficient is determined by partitioning the input data into small nonoverlapped blocks and mapping each of the small nonoverlapped blocks into a block of coefficients.

BRIEF DESCRIPTION OF THE DRAWINGS

FIG. 2 shows a P-macroblock threshold table.

FIG. 3 shows an I-macroblock threshold table.

DETAILED DESCRIPTION OF THE PREFERRED EMBODIMENT

The method described herein is able to eliminate computations for coefficients that become zero at the end of the Forward Scaling process. By eliminating the computations, the Forward Transform and the Forward Scaling processes are much more efficient both in time and computation utilization.

There are two common transformation approaches for compression including block transform and wavelet transform. The block-based approach partitions the input data into small nonoverlapped blocks; each of them is then mapped into a block of coefficients via a particular block transform usually constructed from local cosine/sine bases. The type-II discrete cosine transform (DCT) is the most common block transform for visual data.

Figure 1:
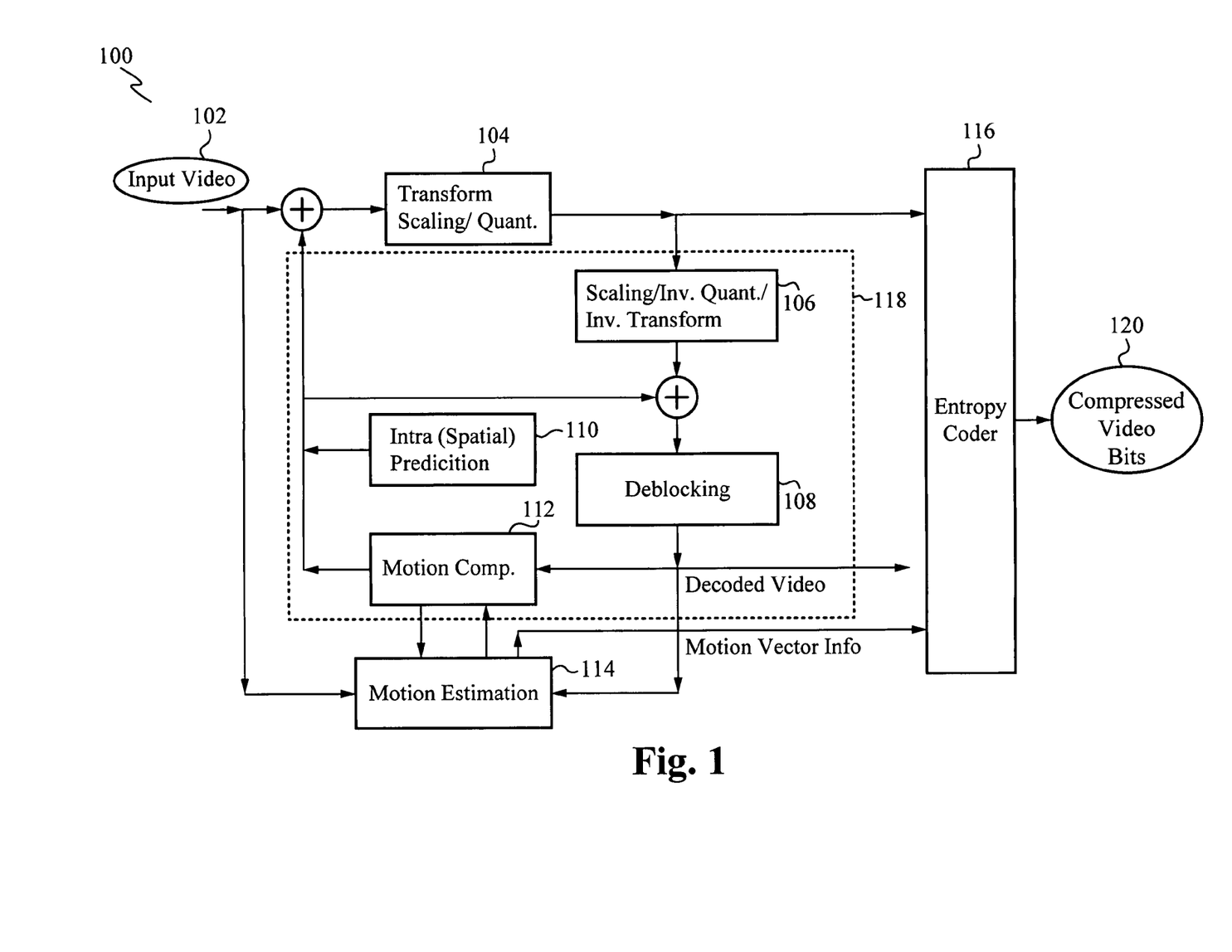
FIG. 1 illustrates a block diagram of the video coding layer of a macroblock.

FIG. 1 shows a block diagram of the video coding layer 100 of a macroblock. The video coding layer 100 (e.g. the encoder) includes a combination of temporal and spatial predictions along with transform coding. An input video 102 is received and split into a plurality of blocks. The first picture of a sequence is usually "intra" coded using only information contained within itself. Each part of a block in an intra frame is then predicted at the intra prediction module 110 using spatially neighboring samples of previously coded blocks. The encoding process chooses which neighboring samples are utilized for intra prediction and how they are used. This process is conducted at the decoder 118 as well as at the encoder 100. For the rest of the pictures of a sequence, usually "inter" coding is used. Inter coding implements motion compensation 112 from other previously decoded pictures. The encoding process for inter prediction/motion estimation 114 includes choosing motion data, determining the reference picture and a spatial displacement that is applied to all samples of the block. The motion data is transmitted as side information which is used by the encoder 100 and decoder 118.

The difference between the original and the predicted block is referred to as the residual of the prediction. The residual is transformed, and the transform coefficients are scaled and quantized at the transform scaling and quantization module 104. For the quantization of transform coefficients, scalar quantization is utilized. Each block is transformed using an integer transform, and the transform coefficients are quantized and transmitted using entropy-coding methods. An entropy encoder 116 uses a codeword set for all elements except the quantized transform coefficients. For the quantized transform coefficients, Context Adaptive Variable Length Coding (CAVLC) is utilized. The deblocking filter 108 is implemented to control the strength of the filtering to reduce the pixelation of the image.

The encoder 100 also contains the decoder 118 to conduct prediction for the next blocks. The quantized transform coefficients are inverse scaled and inverse transformed 106 in the same way as the encoder side which gives a decoded prediction residual. The decoded prediction residual is added to the prediction, and the combination is directed to the deblocking filter 108 which provides decoded video as output. Ultimately, the entropy coder 116 produces compressed video bits 120 of the originally input video 102. The method of reducing computations described further concerns mostly with the transform/scaling/quantization aspect 104 of the encoder 100. Instead of performing transforms and scaling for every coefficient, precalculations are done wherein if the coefficients are below a threshold, they are set to zero and the calculation for that coefficient proceeds no further.

Equation (8-427) in section 8.6.1.1 of Draft Version 4 of H.264/AVC (JVT-M050d0) which is incorporated by reference specifies:

$$c_{ij} = (Sign(c_{ij}^s) * (Abs(c_{ij}^s) * LevelScale2(QS_Y \% 6, i, j) + (1<<(14+QS_Y/6)))) >> (15+QS_Y/6)$$

where:
$c_{ij}$ is the result after scaling,
$c_{ij}^s$ is the value before scaling,
LevelScale2 (m,i,j) is the function defined in (8-425) and
$QS_Y$ is the Quantization Parameter.
This is also written as:

$$c_{ij} = Sign(c_{ij}^s) * ((Abs(c_{ij}^s) * LevelScale2(QS_Y \% 6, i, j) + (1<<(14+QS_Y/6)))) >> (15+QS_Y/6)$$

The above equation can then be simplified as:

$$c_{ij} = Sign(c_{ij}^s) * (A_{ij} * M_{ij} + R) >> S \quad (1.0)$$

where:
$A_{ij} = Abs(c_{ij}^s)$
$M_{ij} = LevelScale2(QS_Y \% 6, i, j)$
$R = (1<<(14+QS_Y/6))$
$S = (15+QS_Y/6)$
$M_{ij}$, R, S depend on $QS_Y$ and are able to be precalculated if $QS_Y$ is known. Therefore, equation (1.0) is able to be used to compute the result after scaling during encoding.

While encoding, if it is determined in advance that the value after scaling ($c_{ij}$) is going to be zero, there is no need to compute the result of equation (1.0). Thus the process is able to directly proceed to assign the value of $c_{ij}$ as zero.

From equation (1.0), it is apparent that $c_{ij} = 0$ if $$(A_{ij} * M_{ij} + R) >> S = 0$$

Thus, the computation of $c_{ij}$ is able to be ignored if:

$$(A_{ij} * M_{ij} + R) < (1<<S) \quad (1.1)$$

or $$(A_{ij} * M_{ij}) < (1<<S) - R \quad (1.2)$$

or $$A_{ij} < ((1<<S) - R)/M_{ij} \quad (1.3)$$

If the threshold is denoted as $T_{ij}$, where:

$$T_{ij} = ((1<<S) - R)/M_{ij} \quad (1.4)$$

then the scaling computation of $c_{ij}$ is able to be ignored if:

$$A_{ij} < T_{ij} \quad (1.5)$$

The values of $T_{ij}$ for each of the 52 possible $QS_Y$ values are able to be precalculated and stored in a lookup table. Since $M_{ij} = M_{(i+2)j}$, a 52×8 table is used instead of a 52×16 table. Since the value of $T_{ij}$ depends on the value of S, which depends on the macroblock type, only two threshold tables are needed, one for P-macroblocks and another for I-macroblocks. FIG. 2 shows a P-macroblock threshold table, and FIG. 3 shows an I-marcroblock threshold table for a scaling scheme that uses:

$$S = (15+QS_Y/6) \text{ and}$$

$$R = (1<<S)/6 \text{ for } P, \text{ and } (1<<S)/3 \text{ for } I$$

For example, if the Quantization Parameter, $QS_Y$, is 44, and the location, (i,j) is (0,0) of a P macroblock, the corresponding threshold is determined using the equations above. From the equations, $S = (15+QS_Y/6) = (15+44)/6 = 22$. Since this utilizes integer division, the decimals values are truncated. Then, $R = (1<<S)/6$, which is 1 left shifted 22 times and divided by 6 which equals 699,050. Also from above, $T_{ij} = ((1<<S) - R)/M_{ij} = ((4,194,304 - 699,050)/M_{ij})$. To determine $M_{ij}$, the Levelscale2 function is utilized, where $M_{ij} = LevelScale2(QS_Y \% 6, i, j)$.

$$LevelScale2(QS_Y \% 6, i, j) = \begin{cases} w_{m0} & \text{for } (i, j) \in \{(0, 0), (0, 2), (2, 0), (2, 2)\}, \\ w_{m1} & \text{for } (i, j) \in \{(1, 1), (1, 3), (3, 1), (3, 3)\}, \\ w_{m2} & \text{otherwise}; \end{cases}$$

where the first subscript, m, of w indicates the row index and the second subscript of w indicates the column index of the matrix below:

$$w = \begin{bmatrix} 13107 & 5243 & 8066 \\ 11916 & 4660 & 7490 \\ 10082 & 4194 & 6554 \\ 9362 & 3647 & 5825 \\ 8192 & 3355 & 5243 \\ 7282 & 2893 & 4559 \end{bmatrix}$$

Therefore, the first subscript, m, is $QS_Y \% 6$, or 44 modulus 6 which equals 2. Further, since (i,j) is (0,0) in this example, the second subscript is 0. Hence, using the matrix directly above, the value of the LevelScale2 function is 10,082. Inputting this value in the equation to determine the threshold, $T_{ij} = ((4,194,304 - 699,050)/10,082) = 346$. Therefore, any coefficient that is below the threshold, 346, where $QS_Y = 44$ and (i, j) = (0,0) for the P macroblock, is going to be zero after scaling. These calculations are possible for all 52 values of $QS_Y$ and the varying values for (i, j) as well as for both the P and I macroblocks.

In some exemplary tests, the implementation of the above optimization scheme is able to reduce the time taken in the forward scaling process by about 246% for a standard definition sequence at a bitrate of 1 Mbps. The method involves some overhead at the end of the forward transform process to compute the result of equation (1.5). However, the speed-up obtained in the scaling process exceeds the delay due to overhead. Using the above method, in some exemplary tests, the forward transform and scaling processes together were about 77% faster compared to the implementation without the optimizations.

The above method is able to be extended to eliminate computations in forward transform as well. The forward transform is given by:

$$c^s = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} p_{00} & p_{01} & p_{02} & p_{03} \\ p_{10} & p_{11} & p_{12} & p_{13} \\ p_{20} & p_{21} & p_{22} & p_{23} \\ p_{30} & p_{31} & p_{32} & p_{33} \end{bmatrix} \quad (1.6)$$

$$\begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

where:
$p_{ij}$ are the coefficients prior to forward transform.

The vertical transform is given by:

$$\begin{bmatrix} v_0 \\ v_1 \\ v_2 \\ v_3 \end{bmatrix} = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} p_{00} & p_{01} & p_{02} & p_{03} \\ p_{10} & p_{11} & p_{12} & p_{13} \\ p_{20} & p_{21} & p_{22} & p_{23} \\ p_{30} & p_{31} & p_{32} & p_{33} \end{bmatrix} \quad (1.7)$$

where $v_i$ is a 1×4 matrix representing the $i^{th}$ row of the vertical transformed matrix.

The horizontal transform from equations (1.6) and (1.7) is, $$c^s = \begin{bmatrix} v_0 \\ v_1 \\ v_2 \\ v_3 \end{bmatrix} \begin{bmatrix} 1 & 2 & 1 & 1 \\ 1 & 1 & -1 & -2 \\ 1 & -1 & -1 & 2 \\ 1 & -2 & 1 & -1 \end{bmatrix} \quad (1.8)$$

$$c^s = \begin{bmatrix} v_0 \\ v_1 \\ v_2 \\ v_3 \end{bmatrix} [w_0 \ w_1 \ w_2 \ w_3] \quad (1.9)$$

where $w_j$ is a 4×1 matrix representing the $j^{th}$ column of the matrix $$\begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

The transformed coefficient $c_{ij}^s$ is therefore given by the product $v_i w_j$. $A_{ij}$ is the absolute value of the coefficient before scaling, which is the same as the absolute value of the coefficient after forward transform.

From equation (1.0), $$A_{ij} = \text{Abs}(c_{ij}^s) \quad (1.10)$$
$$= |v_i w_j|$$
$$= \left| \sum_{k=0}^{3} v_i(k) w_j(k) \right|$$
$$\leq \sum_{k=0}^{3} |v_i(k)||w_j(k)|$$
$$\leq \sum_{k=0}^{3} |v_i(k)| \max(|w_j|)$$
$$= \max(|w_j|) \sum_{k=0}^{3} |v_i(k)|$$

Therefore, $$\text{Abs}(c_{ij}^s) \leq \max(|w_j|) \sum_{k=0}^{3} |v_i(k)| \Rightarrow \quad (1.11)$$

$$\text{Abs}(c_{ij}^s) \leq X_j * \sum_{k=0}^{3} |v_i(k)|,$$

where $X_j = 1$ for $j = 0, 2$; $X_j = 2$ for $j = 1, 3$

From equation (1.5) the result after scaling will be zero if $A_{ij} < T_{ij}$.

Therefore, from equation (1.11), if $$X_j * \sum_{k=0}^{3} |v_i(k)| < T_{ij},$$

then $A_{ij}$ will also be less than $T_{ij}$.

The condition for eliminating horizontal transform and also the scaling computations is therefore:

$$X_j * \sum_{k=0}^{3} |v_i(k)| < T_{ij} \text{ or} \quad (1.12)$$

$$\sum_{k=0}^{3} |v_i(k)| < \frac{T_{ij}}{X_j} \text{ or}$$

$$\sum_{k=0}^{3} |v_i(k)| < \frac{((1 \ll S) - R)}{X_j * M_{ij}}$$

In some implementations, during the horizontal transform, an entire row is processed, and therefore equation (1.12) is able to be modified to eliminate the computations for an entire row (four coefficients). The computations for an entire row of the horizontal transform are able to be skipped if:

$$\sum_{k=0}^{3} |v_i(k)|, \frac{((1 << S) - R)}{\max(X_j * M_{ij})} \quad (1.13)$$

or $$\sum_{k=0}^{3} |v_i(k)| < T_i', \text{ where}$$

$$T_i' = \frac{((1 << S) - R)}{\max(X_j * M_{ij})} \quad (1.14)$$

Thus, a new threshold ($T_i'$) is able to be defined for each row of the 4×4 matrix obtained after the vertical transform, and eliminate the horizontal transform and scaling computations for each row if the absolute sum of the coefficients is less than the threshold. The values of $T_i'$ for each of the 52 possible $QS_Y$ values are able to be precalculated and stored in a 52×2 lookup table. As seen in the case of $T_{ij}$, the $T_i'$ thresholds too require two separate tables, one for P-macroblocks and the other for 1-macroblocks.

To identify the coefficients that do not need horizontal transform and scaling computations, a flag is assigned to each coefficient. In some embodiments, a value of 1 for the flag represents that the transform and scaling computations need to be performed, and a value of 0 for the flag represents that the computations are able to be skipped. If the computations are skipped, the final value of zero is assigned to the coefficients. The flags are generated at the end of the vertical transform process based on the result of equation (1.13). If the condition of equation (1.13) is true, the flags corresponding to all the coefficients in that row are assigned a value of 0. If the condition of equation (1.13) is not satisfied, the flags for the coefficients are set as 1.

Thus, using a lookup table containing thresholds, the above technique is able to speed up several time-consuming aspects of the H.264 coding process without adding much overhead.

Figure 4:
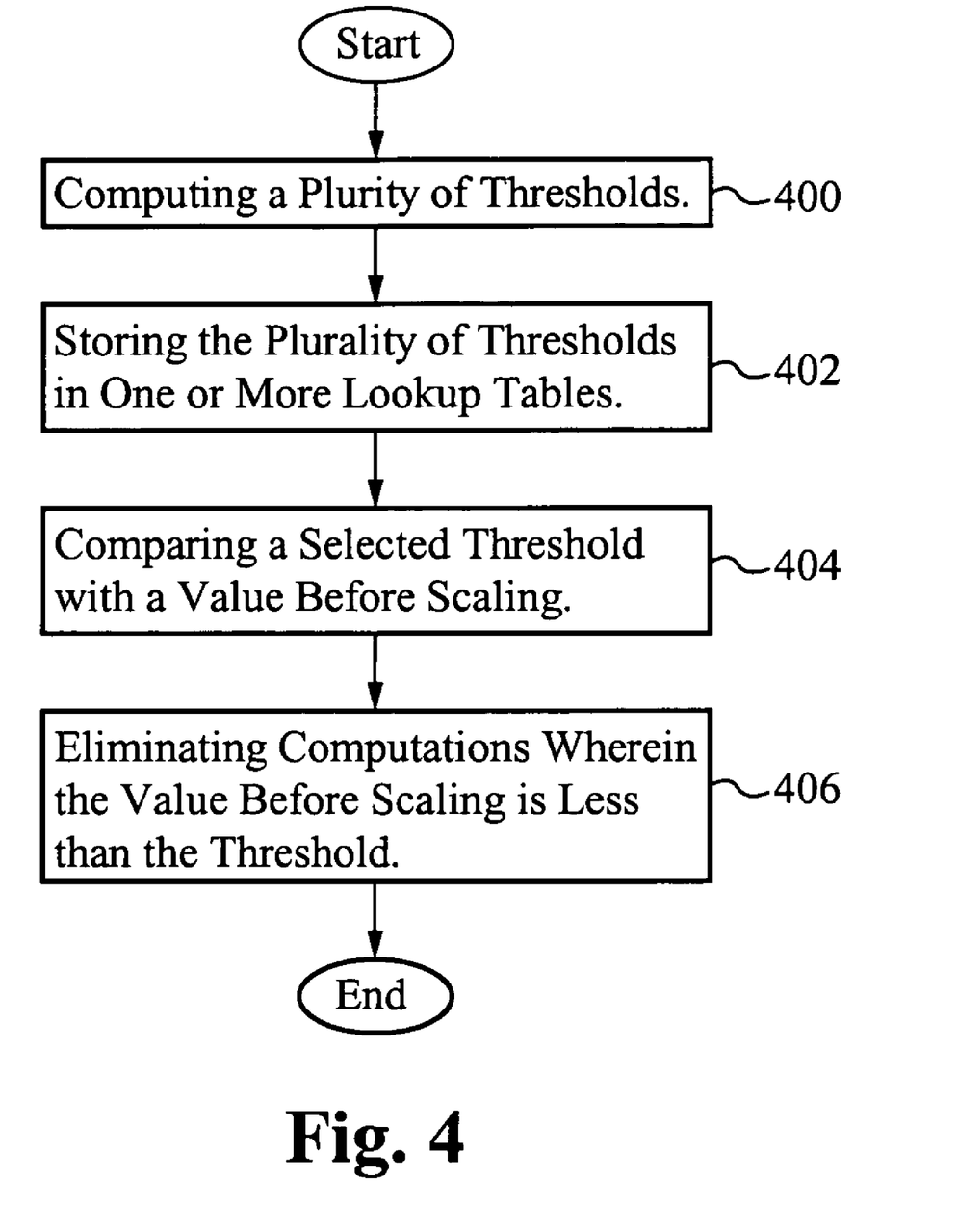
FIG. 4 illustrates a flow chart of a method of reducing the number of computations for scaling and transform processes.

FIG. 4 illustrates a flow chart of a method of reducing the number of computations for the scaling process. In the step 400, a plurality of thresholds is computed. The plurality of thresholds are determined utilizing the equations described above. Then, in the step 402, the plurality of thresholds are stored in one or more lookup tables. Furthermore, the one or more lookup tables are contained within any type of data file such as a database. In the step 404, a selected threshold is compared with a value before scaling. The threshold is selected based on a quantization parameter and the location of coefficients. In the step 406, further computations are eliminated where the value before scaling is less than the threshold. Moreover, the coefficients where the value before scaling is less than the threshold are set to zero.

Figure 5:
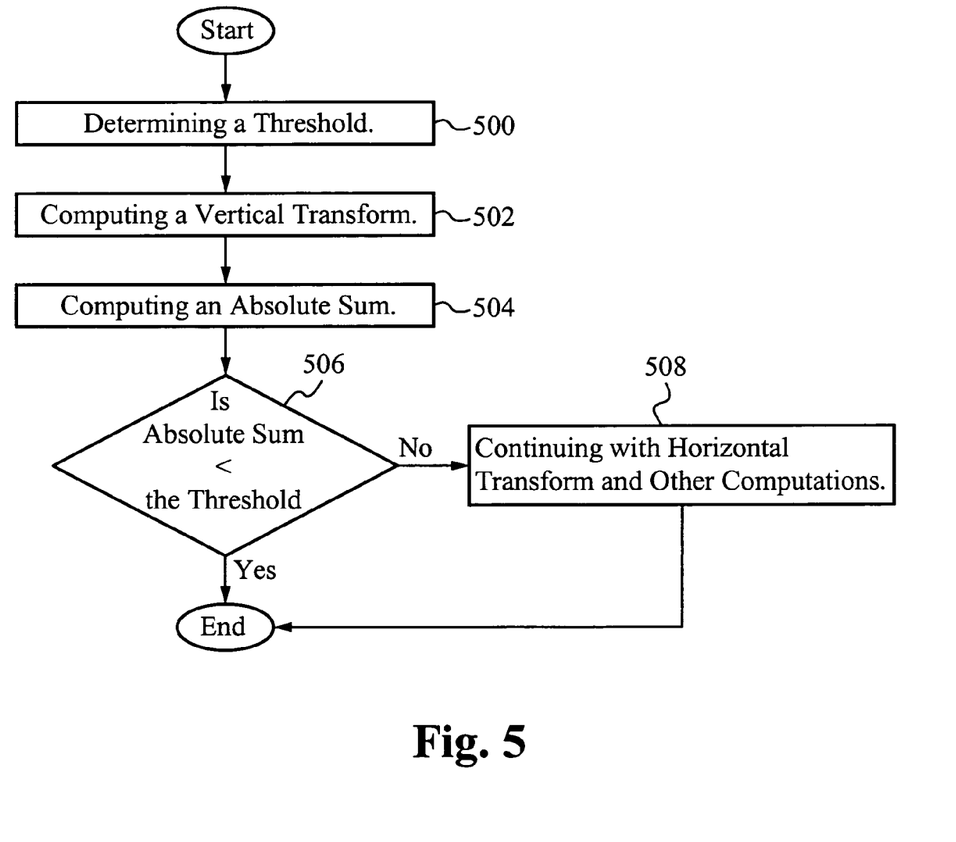
FIG. 5 illustrates a flow chart of a method of reducing the number of computations for scaling and transform processes.

FIG. 5 illustrates a flow chart of a method of reducing the number of computations for scaling and transform processes. In the step 500, a threshold is determined. The threshold is determined based on a quantization parameter and a set of coefficients. Moreover, the threshold is able to be stored in one or more lookup tables. In the step 502, a vertical transform is computed utilizing the equations above. In the step 504, an absolute sum is computed also from the equations above. In the step 506, if the absolute sum is less than the threshold, then no further computations are required. More specifically, the horizontal transform and scaling do not need to be computed for the coefficient. Furthermore, the coefficients are set to zero if the absolute sum is less than the threshold. However, if the absolute sum is not less than the threshold, the horizontal transform is computed and other computations such as scaling are performed in the step 508. Additionally, a flag is set for each coefficient depending on whether the coefficient is set to zero or not. In some embodiments, the flag is set to zero if the coefficient is set to zero, and the flag is one if the coefficient is not zeroed.

To utilize an embodiment of the method of reducing the computations in an encoder, a plurality of thresholds are stored within one or more lookup tables. The one or more lookup tables are contained within a data file such as a database. A program implements the necessary equations above to determine a value before scaling. The program also selects the appropriate thresholds from the lookup tables and then compares the value before scaling with the selected thresholds. If the program determines the value before scaling is less than the selected thresholds, coefficients are set to zero since the coefficients would be zero if all of the computations were performed anyway. However, if the value before scaling is not less than the thresholds, then further computations are required by the program. The results of the comparisons are utilized further in the encoder to eventually produce a compressed video. The program also sets a flag related to each coefficient wherein the flag is set to one when the value before scaling is greater than the threshold and zero when the value is less than the threshold.

In an embodiment of the method of reducing the computations in an encoder, a threshold is determined. The threshold is able to be determined utilizing one or more lookup tables. A vertical transform is then computed using the equations above. An absolute sum is also computed. If the absolute sum is less than the threshold, a coefficient is set to zero and no further computations are required with that coefficient. However, if the absolute sum is more than the threshold, further computations are required including the horizontal transform and scaling. Additionally, a flag is set to correspond with the coefficient, wherein a coefficient of zero results in a flag equal to zero and for a coefficient not zero, the flag is set to one.

In operation, the method of reducing computations in an encoder is able to decrease the required time and computation power of an H.264 encoder. Part of the coding process includes forward transform and scaling. These aspects of the coding process are greatly reduced by implementing the method where one or more lookup tables are utilized to store thresholds which are compared with specified values to determine if a coefficient is going to be zero. Instead of lengthy computations, the method described herein is able to utilize the threshold to preemptively determine if the coefficient will be zero and then skip the processes of horizontal transform and scaling in these instances.

The method described herein is able to be implemented with/on devices including, but not limited to, laptops, personal computers, servers, cell phones, PDAs, video-iPods, DVD recorders, DVDs, digital cameras/camcorders, video game consoles, portable video game players, security such as video surveillance, high definition television broadcast, video phones, videoconferencing, video streaming over the internet and other multimedia applications.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of reducing computations in transform and scaling processes in video encoding processes, comprising:
   a. computing one or more thresholds, wherein the one or more thresholds are stored in two or more look up tables and the two or more lookup tables include a first table for P-macroblocks and a second table for 1-macroblocks;
   b. comparing a selected threshold from the one or more thresholds with a transform coefficient before scaling, wherein the selected threshold is selected based on one or more quantization parameters and one or more locations of coefficients; and
   c. eliminating computations where the transform coefficient before scaling is less than the selected threshold.

2. The method as claimed in claim 1 wherein the computations are reduced in a video encoder.

3. The method as claimed in claim 2 wherein the video encoder utilizes H.264 standard protocol.

4. The method as claimed in claim 1 further comprising assigning one or more flags a first value when further computations need to be performed and a second value when further computations do not need to be performed.

5. The method as claimed in claim 1 wherein the computations eliminated include scaling.

6. The method as claimed in claim 1 wherein the transform coefficient is determined by partitioning the input data into small nonoverlapped blocks and mapping each of the small nonoverlapped blocks into a block of coefficients.

7. A method of reducing computations in transform and scaling processes in video encoding processes, comprising:
 a. storing one or more thresholds in two or more lookup tables, wherein the two or more lookup tables include a first table for P-macroblocks and a second table for 1-macroblocks;
 b. comparing a selected threshold from the one or more thresholds with a transform coefficient before scaling, wherein the selected threshold is selected based on one or more quantization parameters and one or more locations of coefficients; and
 c. eliminating computations where the transform coefficient before scaling is less than the selected threshold.

8. The method as claimed in claim 7 wherein the computations are reduced in a video encoder.

9. The method as claimed in claim 8 wherein the video encoder utilizes H.264 standard protocol.

10. The method as claimed in claim 7 further comprising computing the one or more thresholds stored in the two or more lookup tables.

11. The method as claimed in claim 7 further comprising assigning one or more flags a first value when further computations need to be performed and a second value when further computations do not need to be performed.

12. The method as claimed in claim 7 wherein the computations eliminated include scaling.

13. The method as claimed in claim 7 wherein the transform coefficient is determined by partitioning the input data into small nonoverlapped blocks and mapping each of the small nonoverlapped blocks into a block of coefficients.

14. A method of reducing computations in transform and scaling processes in video encoding processes, comprising:
 a. determining a threshold based on one or more quantization parameters and one or more locations, wherein determining utilizes two or more look up tables and the two or more lookup tables include a first table for P-macroblocks and a second table for 1-macroblocks;
 b. computing a vertical transform;
 c. computing an absolute sum using the vertical transform; and
 d. eliminating computations where the absolute sum is less than the threshold.

15. The method as claimed in claim 14 wherein the computations are reduced in a video encoder.

16. The method as claimed in claim 15 wherein the video encoder utilizes H.264 standard protocol.

17. The method as claimed in claim 14 further comprising assigning one or more flags a first value when further computations need to be performed and a second value when further computations do not need to be performed.

18. The method as claimed in claim 14 wherein the computations eliminated include horizontal transform and scaling.

19. An apparatus comprising:
 a. a program module for determining one or more thresholds based on one or more quantization parameters and one or more locations, computing a vertical transform, computing an absolute sum using the vertical transform and eliminating computations where the absolute sum is less than the selected threshold;
 b. a processor for executing the program module; and
 c. one or more databases for storing two or more lookup tables, wherein the two or more lookup tables include a first table for P-macroblocks and a second table for 1-macroblocks.

20. The apparatus as claimed in claim 19 wherein the two or more lookup tables contain the one or more thresholds.

21. The apparatus as claimed in claim 19 wherein the program module utilizes the two or more lookup tables containing the one or more thresholds to determine the selected threshold.

22. The apparatus as claimed in claim 19 further comprising one or more flags.

23. The apparatus as claimed in claim 19 wherein the one or more flags are assigned a first value when further computations need to be performed and a second value when further computations do not need to be performed.

24. A video encoder comprising:
 a. a decoder;
 b. a component for transforming, scaling and quantizing coupled to the decoder;
 c. an entropy coder coupled to the component for transforming, scaling and quantizing, wherein the entropy coder produces one or more compressed video bits; and
 d. two or more lookup tables wherein the two or more lookup tables include a first table for P-macroblocks and a second table for 1-macroblocks,
 wherein the component for transforming, scaling and quantizing avoids computations where a transform coefficient before scaling is less than a computed threshold, wherein the computed threshold is selected based on one or more quantization parameters and one or more locations of coefficients.

25. The video encoder as claimed in claim 24 further comprising a motion estimation component.

26. The video encoder as claimed in claim 24 wherein the decoder provides decoded video.

27. The video encoder as claimed in claim 24 wherein the two or more lookup tables contain one or more thresholds.

28. The video encoder as claimed in claim 24 wherein the video encoder utilizes H.264 standard protocol.

29. The video encoder as claimed in claim 24 wherein the component for transforming, scaling and quantizing avoids scaling where the transform coefficient before scaling is less than the threshold.

30. The video encoder as claimed in claim 24 wherein the transform coefficient is determined by partitioning the input data into small nonoverlapped blocks and mapping each of the small nonoverlapped blocks into a block of coefficients.

31. A video capture and display device comprising:
 a. a receiving unit for receiving video data;
 b. a display unit coupled to the receiving unit for displaying video data;
 c. an encoder coupled to the receiving unit and the display unit for producing one or more compressed video bits; and
 d. two or more lookup tables wherein the two or more lookup tables include a first table for P-macroblocks and a second table for 1-macroblocks,
 wherein the encoder avoids computations where a transform coefficient before scaling is less than a computed threshold, wherein the computed threshold is selected based on one or more quantization parameters and one or more locations of coefficients.

32. The video capture and display device as claimed in claim 31 wherein the two or more lookup tables contain one or more thresholds.

33. The video capture and display device as claimed in claim 31 wherein the encoder utilizes H.264 standard protocol.

34. The video capture and display device as claimed in claim 31 wherein the encoder avoids scaling where the transform coefficient before scaling is less than the computed threshold.

35. The video capture and display device as claimed in claim 31 wherein the transform coefficient is determined by partitioning the input data into small nonoverlapped blocks and mapping each of the small nonoverlapped blocks into a block of coefficients.

36. A method of reducing computations in transform and scaling processes in video encoding processes, comprising:
   a. computing a plurality of discrete cosine transform thresholds based on one or more quantization parameters and one or more locations, wherein the plurality of thresholds are separately stored within a first table for P-macroblocks and a second table for l-macroblocks;
   b. comparing a selected threshold from the plurality of thresholds with a transform coefficient before scaling; and
   c. eliminating computations where the transform coefficient before scaling is less than the selected threshold.

* * * * *